May 4, 1948.     G. H. BABIGIAN     2,441,055
PIPE COUPLING
Filed Aug. 23, 1944
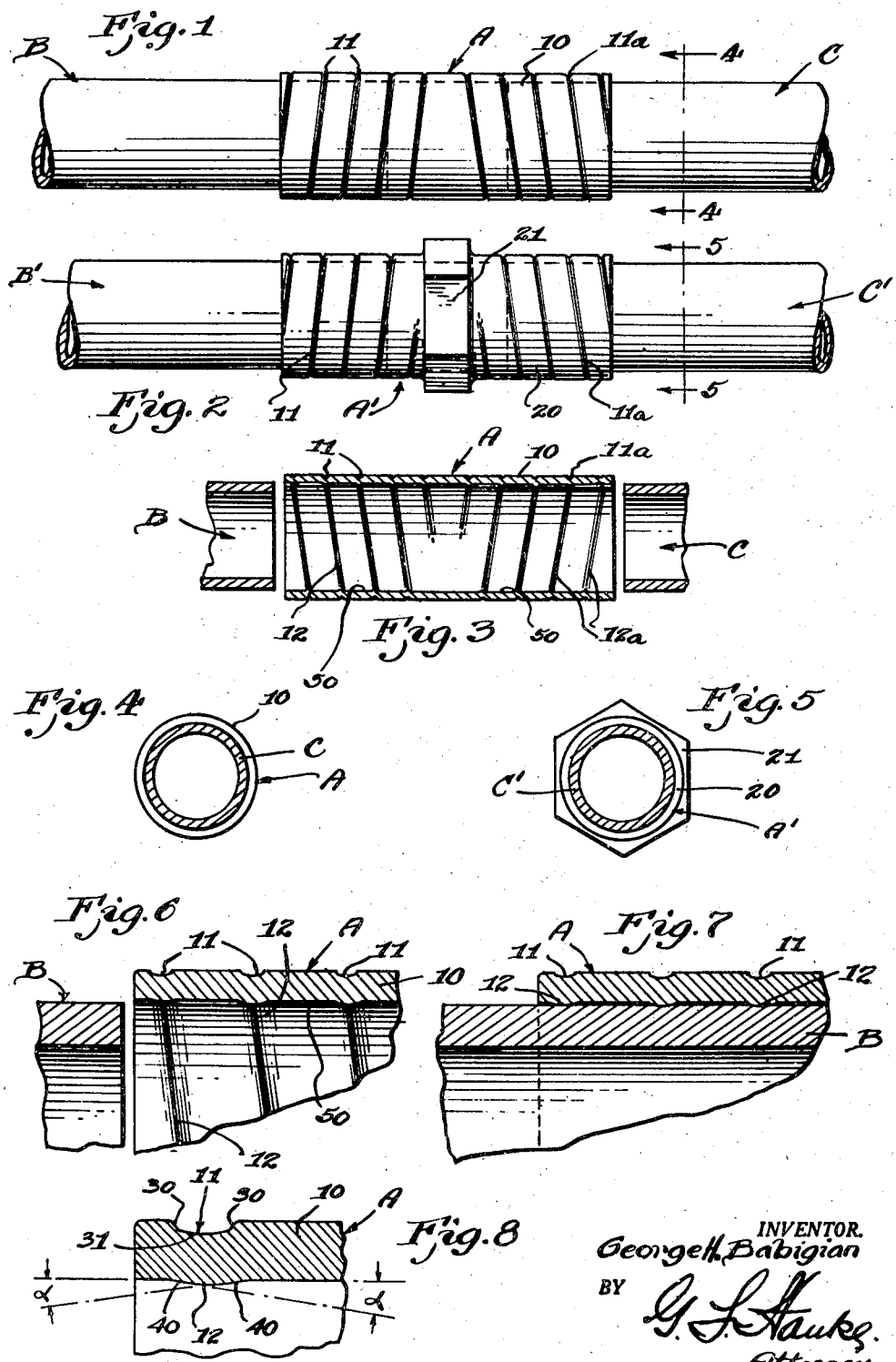
INVENTOR.
George H. Babigian
BY G. L. Hauke.
Attorney.

Patented May 4, 1948

2,441,055

UNITED STATES PATENT OFFICE 2,441,055

PIPE COUPLING

George H. Babigian, Ferndale, Mich., assignor to Roland B. Seferian, Highland Park, Mich.

Application August 23, 1944, Serial No. 550,777

3 Claims. (Cl. 285—145)

My invention relates to pipe couplings and more particularly to couplings for securing abutting or near abutting pipes or conduits together.

Heretofore, various complicated types of couplings have been employed for coupling conduits together, most generally being composed of several interengaging members, which necessitate the employment of special tools and fixtures for assembling same. There are many uses for couplings of this type, and it has been found most desirable in many cases to couple such pipes or conduits together with speed. It is an object of my present invention to provide a pipe coupling which may be assembled to such pipes or conduits with a minimum of time or labor but which provide a union which is secure and rugged.

More particularly, the object of my present invention is to construct an improved coupling for pipes or conduits by providing the coupling with internal spiral rounded ribs which wedge with the conduit or pipe when same is threaded therein.

For a more detailed understanding of my invention, reference may be had to the accompanying drawing illustrating a preferred embodiment of my invention, and in which:

Fig. 1 is an elevational view of my improved coupling assembled with axially aligned pipes or conduits, Fig. 2 is an elevational view of a modified form of construction, Fig. 3 is a longitudinal sectional view thereof, showing the pipes or conduits disengaged, Fig. 4 is a transverse sectional view taken on the line 4—4 of Fig. 1, Fig. 5 is a transverse sectional view taken on the line 5—5 of Fig. 2, Fig. 6 is an enlarged fragmentary sectional view of the sleeve coupling showing the pipe about to be threaded therein, Fig. 7 is a fragmentary sectional view showing the pipe or conduit threaded into the coupling, and Fig. 8 is an enlarged fragmentary sectional view illustrating more clearly the specific construction of the internal rounded spiral thread.

I have illustrated my invention more particularly in the accompanying drawing as comprising a coupling A constructed to secure together near abutting axially aligned pipes or conduits B and C. In the preferred form of my invention, the coupling A comprises a cylindrical tube like sleeve 10 having right and left hand spiral grooves 11 and 11a respectively rolled into the external surface thereof. When such grooves are rolled into the sleeve they form rounded spiral ribs 12 and 12a respectively internally of said sleeve, these ribs being constructed to grip the pipe or conduit when same is threaded therein.

In Fig. 2 I have illustrated a slightly modified form of construction comprising a sleeve 20 arranged externally with a multi-sided nut 21, here shown as a hexagon nut, and located substantially at a mid-point thereof. This coupling is designated as a whole by the reference character A' and is constructed to couple together pipes or conduits B' and C'.

Referring more particularly to Figs. 6, 7 and 8, it will be observed that the groove 11 is constructed preferably with sloping side walls 30 and a concave rounded bottom wall 31. When this groove 11 is rolled into the external surface of sleeve 10, it will be observed that a rounded rib 12 is formed internally of the sleeve. This rounded rib 12 is formed with sides 40 which are slightly tapered with respect to the axial internal surface of the sleeve, this taper being designated in Fig. 8 by the angle α. The angle of this taper is preferably less than 10° (ten degrees) and is usually approximately in the neighborhood of five (5°) to seven (7°) degrees, and thus provides for a wedging engagement with the pipe when same is threaded into the sleeve coupling. The internal rib thus does not cut or scratch into the external surface of the pipe but is substantially wedged against the external surface of said pipe, and may slightly depress the said external surface but to an unappreciable extent. The wedging engagement of the internal rib of said sleeve with the external surface of the pipe or conduit securely resists axial slippage of said pipe and sleeve.

It will be further noted that the internal rib is formed as a widely spaced spiral to provide substantially cylindrical lands 50 between the ribs.

The present improved pipe coupling provides a very rugged and secure engagement with the pipe or conduits and it is found possible to thread a coupling of this construction onto the pipe or conversely thread the pipe into the coupling by hand, in such a way as to so tightly wedge same together as to make it substantially impossible to release or disengage same by hand. Furthermore, the present construction can be inexpensively manufactured, and is of such a design as to facilitate the assembly of the coupling with pipes or conduits with a minimum of time and labor.

It will be apparent to those skilled in the art to which my invention pertains, that various modifications and changes may be made therein without departing from the spirit of my invention or from the scope of the appended claims.

I claim:

1. A pipe coupling comprising a sleeve provided internally with spirally extending rounded ribs constructed to grip a pipe threaded therein, said ribs having sides inclined at a slight taper to the axial internal surface of said sleeve and thereby engaging said pipe with a wedge action, said rib being wedged into the external surface of said pipe, said wedge engagement of said sleeve and pipe resisting axial slippage of said pipe and sleeve, said spiral rounded ribs being widely spaced to provide substantial cylindrical lands intermediate said ribs.

2. A pipe coupling comprising a sleeve provided internally with rounded spiral ribs constructed to grip a pipe threaded therein, said ribs having sides inclined at a slight taper to the axial internal surface of said sleeve and thereby engaging said pipe with a wedge action, said rib being wedged into gripping engagement with the external surface of said pipe, said wedge engagement of said sleeve and pipe resisting axial slippage of said pipe and sleeve, said spiral rounded ribs being widely spaced to provide substantial cylindrical lands intermediate said ribs, said sleeve having a spiral groove in the external surface thereof and said internal rounded spiral ribs on the internal surface thereof underlying said spiral groove, said external groove having sloping sides and a rounded bottom surface.

3. A pipe coupling comprising a sleeve provided internally with rounded spiral ribs constructed to grip a pipe threaded therein, said ribs having sides inclined at a relatively slight taper to the axial internal surface of said sleeve and thereby engaging said pipe with a wedge action, said rib being wedged into the external surface of said pipe, said wedge engagement of said sleeve and pipe resisting axial slippage of said pipe and sleeve.

GEORGE H. BABIGIAN.

REFERENCES CITED

The following references are of record in the file of this patent:

UNITED STATES PATENTS

| Number | Name | Date |
| --- | --- | --- |
| 91,291 | Wegman | June 15, 1869 |
| 319,144 | Stephens et al. | June 2, 1885 |
| 487,434 | Steen | Dec. 6, 1892 |
| 1,412,469 | Jimerson | Apr. 11, 1922 |
| 1,837,294 | Scheid | Dec. 22, 1931 |
| 2,152,962 | Ice | Apr. 4, 1939 |

FOREIGN PATENTS

| Number | Country | Date |
| --- | --- | --- |
| 2,020 | Italy | Dec. 22, 1890 |
| 330,123 | Great Britain | June 5, 1930 |